United States Patent [19]
Vorst et al.

[11] 4,401,992
[45] Aug. 30, 1983

[54] METHOD OF MARKING A SYNTHETIC MATERIAL SURFACE AND TO AN OBJECT HAVING THE MARKED SYNTHETIC MATERIAL SURFACE

[75] Inventors: Henricus H. M. Vorst; Jozef J. J. Bastiaens; Enno C. Munk, all of Eindhoven, Netherlands

[73] Assignee: U.S. Philips Corporation, New York, N.Y.

[21] Appl. No.: 238,273

[22] Filed: Feb. 25, 1981

[30] Foreign Application Priority Data

Mar. 25, 1980 [NL] Netherlands .......................... 8001731

[51] Int. Cl.³ ............................................ G01D 15/10
[52] U.S. Cl. .................................... 346/76 L; 346/1.1
[58] Field of Search .................................. 346/76 L, 1; 219/121 LH; 372/10

[56] References Cited

U.S. PATENT DOCUMENTS

| | | | |
|---|---|---|---|
| 3,588,439 | 6/1971 | Heller et al. | 219/121 LH |
| 3,657,510 | 4/1972 | Rothrock | 372/10 X |
| 4,214,249 | 7/1980 | Kasai et al. | 346/76 L |

Primary Examiner—George H. Miller, Jr.
Attorney, Agent, or Firm—Norman N. Spain

[57] ABSTRACT

A method of marking objects having a surface of a synthetic material and an object having the marked synthetic material for the purpose of identification which method comprises exposing the surface of the synthetic material to a laser beam of light of intensity of at least 1000 kW/cm² at the surface of the material and wherein the synthetic material contains a dye and a silicon-containing inorganic compound or a dye comprising silicon, such as, a sulphur containing sodium aluminium silicate which is decomposed to form a color contrast mark on the surface on exposure to said laser beam.

5 Claims, 1 Drawing Figure

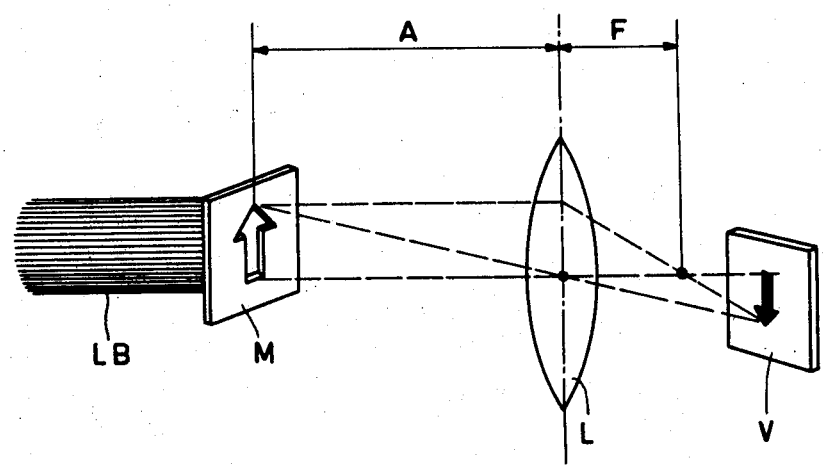

METHOD OF MARKING A SYNTHETIC MATERIAL SURFACE AND TO AN OBJECT HAVING THE MARKED SYNTHETIC MATERIAL SURFACE

BACKGROUND OF THE INVENTION

The invention relates to a method of marking an object having a synthetic resin material surface by exposing the surface to a laser beam. The invention also relates to an object having a synthetic resin material surface which has been marked in accordance with the method of the invention.

The method according to the invention may be used for marking objects which have been provided, at least locally, with a synthetic resin material surface or objects which consists wholly of a synthetic resin material. An example of objects which consist of synthetic resin material are the housings for electronic components such as capacitors etc. Housings of this type are marked with, inter alia, a type designation.

Marking synthetic resin material objects by means of laser beams is described in the periodical laser Focus, July 1975, page 28 "Fast laser pulser can etch a pattern in a moving part on a production line".

In accordance with this known method synthetic resin material objects which are composed of at least two layers of synthetic resin material of a different colour are exposed to a laser beam, the upper layer of the two layers of synthetic resin material being locally removed in accordance with a desired marking pattern. As a result thereof the second layer of the synthetic material layers is locally exposed.

In this known method it is a requirement for the synthetic resin material object to be composed of at least two synthetic resin materials of different colours.

SUMMARY OF THE INVENTION

A principal object of this invention is to provide an improved method for the marking, by use of a laser beam, of an object the surface of which is formed of a synthetic resin material.

This and other objects of the invention will be apparent from the description that follows.

The invention is based on the discovery that it is possible to locally convert a coloured synthetic resin material surface, as defined hereinafter, into a synthetic resin material of a different colour which is in contrast with the original colour when a laser beam of a sufficient intensity is used.

According to the invention, the method is characterized in that the synthetic resin contains a dye and a silicon-containing inorganic compound or a silicon containing pigment and that it is exposed to a laser beam having an intensity of at least 1000 kW/cm², measured on the substrate.

In the method in accordance with the invention the dye or pigment is decomposed and the silicon-containing inorganic compound remains behind in the form of a silicon-containing product which forms a good contrast with the original colour of the dye or pigment.

The invention is suitable both for the application of a single designation on a synthetic resin surface and for use in mass production. To apply a single designation on a single resin material surface, the surface is exposed to a beam having an intensity of at least one thousand kW/cm². Irradiation may be carried out with 1-5 pulses.

In mass production, in which a large number of objects each having at least locally a synthetic resin surface which must be marked, the object is preferably exposed to the beam through a mask and a focussing lens. A pulse duration of 0.1-4 microseconds and a frequency of 0.1-100 Hz can be used. The surfaces may then also be irradiated by 1-5 pulses.

As an example of the method in accordance with the invention a synthetic resin material surface may be irradiated contains a sulphur-containing sodium aluminum silicate pigment of such type contain silicon and function as a "dye" for the synthetic resin material from which the synthetic material surface has been produced.

A properly contrasting mark is obtained when the pigment "ultramarine blue" ("pigment bleu 29") is used.

The invention provides a method of marking a synthetic material surface. Marking is here understood to mean the application of characters, such as letters, figures, algebraic symbols, dots and commas, which are perceptible to the normal human eye.

Marking coloured synthetic resin layers with micro-information by means of laser beams is also known per se. This micro-information (having a size of some micrometers) is read with a laser beam. U.S. Pat. No. 3,465,352 discloses, for example, a method in which a layer of a coloured synthetic material is exposed to a laser beam. This produces colourless spots of approximately 2 micrometers in the synthetic material. As there is no sufficient contrast between the coloured synthetic material and the decolored places and due to the naked small dimensions, such places cannot be read with the eye.

Suitable synthetic resin materials of which the synthetic resin material surface may be produced are, for example, polypropylene, polyethelene, polystyrene, polyacrylate, polymethacrylate and polyphenyleneoxide. Also the copolymers are suitable. Good results have been obtained with polypropylene in particular. When a large number of synthetic resin material surfaces is to be marked, the desired marking can be provided on the appropriate synthetic material surface in its entirety by means of a single "light flash" of a pulsed laser through a mask. A negative of the marking pattern is then cut out in the mask. The mask is arranged between the laser source and a converting lens. The object is positioned at that side of the lens which faces away from the laser source and beyond the focus of the lens. The intensity of the laser beam on the synthetic material surface can be adjusted by using either the reduction (or possibly the magnification) power of the lens.

A suitable laser is, for example, a TEA (transversally excited atmosphere) $CO_2$ laser, a ruby laser or a neodymium laser. It is, however, a condition that a laser is used which produces an intensity of at least 1000 kW/cm² on the substrate. At a lower intensity the desired effect, namely a clear mark, does not occur or occurs only to an insufficient extent.

In the method in accordance with the invention, a synthetic resin material surface containing a sulphur-containing sodium aluminum silicate pigment is preferably used. Examples of this type of pigment are pigment blue (pigment blue 29), pigment green (pigment green 16), pigment red or violet (pigment violet 25). Particularly when a synthetic resin material surface, dyed with pigment blue is used a clear mark is obtained as a result of a good contrast being formed between the irradiated and non-irradiated portions of the synthetic resin material surface.

After irradiation with the laser beam a pit which is filled for the greater part with a decomposition product remains in the synthetic resin material surface. This decomposition product is in good contrast with the original colour of the pigment. Although the mechanism of the occurring phenomena is not fully understood it would appear to be reasonable to assume that on irradiation the pigment decomposes and a silicon-containing product of a contrasting colour remains behind. It was found empirically that this effect only occurs when the synthetic materials of the synthetic material surface is coloured with a sulphur-containing sodium aluminum silicate pigment or when the synthetic material comprises a dye and a silicon-containing inorganic compound.

BRIEF DESCRIPTION OF THE DRAWING

The sole FIGURE in the drawing is diagrammatic view of a preferred embodiment of the invention.

DESCRIPTION OF THE PREFERRED EMBODIMENTS

The invention will now be further described in greater detail with reference to the drawing the sole FIGURE of which is a diagrammatic view of a preferred embodiment of the method of the invention and to the following examples.

EXAMPLE I

Polypropylene marketed by Shell (PKN 8100), without filler, was mixed with 0.5% by weight of one of the pigments referred to in the following Table, and the mixture was extruded. The coloured polypropylene was cut into granules and thereafter pressed in a mould at 200° C. to form sample plates each having dimensions of 40×55×2 mm.

All sample plates were then irradiated in a device which is schematically shown in the FIGURE of the accompanying drawing. In the FIGURE the laser beam LB which originates from a laser source, not shown, is directed through mask M and lens L to the object V. The reduction depends on the ratio of the distance A between the mask M and the lens L to the distance F (where F is the focal length of the lens L). A TEA-$CO_2$ pulsed laser having a beam diameter of 30×30 mm was used. The pulse duration was 1 microsecond, the pulse content was 3 Joules. The frequency was 10 Hz. The intensity of the pulse thus, was 3000 kW per 30×30 $mm^2 = 333$ kW/$cm^2$. The ratio A to F was chosen so that a linear reduction of 6 times was obtained. This means that the intensity on the object was 12000 kW/$cm^2$. The marking obtained on the sample plates 1 to 3, inclusive, of the following Table was very legible, due to the good contrast produced between the white marking and the surrounding mass of coloured synthetic material. A marking in the form of a pit in the synthetic material was indeed obtained on sample plate 4 but this marking was, however, legible to an insufficient extent as no colour contrast occurred.

The following Table shows the pigments used.

TABLE

| Sample plate | pigment | result |
| --- | --- | --- |
| 1 | Ultramarine blue | White/blue |

TABLE-continued

| Sample plate | pigment | result |
| --- | --- | --- |
|   | (pigment blue 29; CI 77007) | contrast |
| 2 | Ultramarine violet (pigment violet 15; CI 77007) | White/violet contrast |
| 3 | Ultramarine red (pigment violet 15; CI 77007) | White/red contrast |
| 4 | copper phtalo-cyanine (pigment blue 15; CI 74160) | no contrast. Synthetic material locally burned away. |

The plates 1 to 3, inclusive, are suitable for the method embodying the invention. Sample 4 is used for the purpose of comparison.

EXAMPLE II

A lacquer consisting of 100 g phenol formaldehyde solution (70%), 2 g titanium dioxide, 35 g toluene, 0.5 g of a thickening agent and 15 g ultramarine blue (pigment blue 29; CI 77007) was applied onto a glass plate. The lacquer was dried in the air for 60 minutes and thereafter hardened at 160° C. for 60-90 minutes.

The synthetic resin surface (lacquer layer) of the glass plate was exposed to a laser beam in the same way as described in Example I. A very legible marking was obtained.

EXAMPLE III

Polyamide 6-6(Ultramid BASF, code number A3HG5) was mixed with 25% glass powder. The resultant mixture was made into a plate having the same dimensions as indicated in Example I. The plate was of a brown colour. The brown colour was caused by a stabilizer which the manufacturer had added to the polyamide.

The resultant plate was exposed to a laser beam in the same way as described in Example I.

A good marking with a distinct white/brown contrast was obtained.

What is claimed is:

1. A method of marking an object having a synthetic resin surface by causing a color contrast pattern to be formed in said surface by exposure of said surface to a laser beam, characterized in that present in said surface is a colored inorganic silicate pigment or a mixture of a dye and a silicate glass and that desired areas of said surface are exposed to a laser beam having an intensity of at least 1000 kw/$cm^2$, measured on said surface, thereby decomposing said inorganic silicate pigment or said dye at said exposed areas and thereby changing the color of said exposed areas of said surface.

2. An object having a synthetic material surface marked in accordance with the method claimed in claim 1.

3. A method as claimed in claim 2, characterized in that the pigment is Ultramarine blue.

4. The method of claim 1 characterized in that the synthetic resin surface includes a sulfur-containing sodium aluminum silicate pigment and that desired areas of said surface are exposed to a laser beam having an intensity of at least 1000 kw/$cm^2$, measured on said surface.

5. A method as claimed in claim 1, characterized in that the synthetic material surface is exposed through a mask and a converging lens to 1-5 pulses of a pulsed laser having a pulse duration of 0.1-4 microseconds and a frequency of 0.1-100 Hz.

* * * * *

UNITED STATES PATENT AND TRADEMARK OFFICE
CERTIFICATE OF CORRECTION

PATENT NO. : 4401992
DATED : August 30, 1983
INVENTOR(S) : HENRICUS H.M. VORST ET AL It is certified that error appears in the above—identified patent and that said Letters Patent is hereby corrected as shown below:

Col. 1, Line 24, Change "laser" to --Laser--.

Signed and Sealed this

Seventeenth Day of January 1984

[SEAL]

Attest:

GERALD J. MOSSINGHOFF

Attesting Officer

Commissioner of Patents and Trademarks